United States Patent [19]

Shoemaker

[11] Patent Number: 4,637,481
[45] Date of Patent: Jan. 20, 1987

[54] SELF-PROPELLED SCALE TESTING VEHICLE

[76] Inventor: Roger E. Shoemaker, Rt. 1, Box 87, Webster, S. Dak. 57274

[21] Appl. No.: 861,632

[22] Filed: May 7, 1986

Related U.S. Application Data

[63] Continuation of Ser. No. 552,671, Nov. 17, 1983, abandoned.

[51] Int. Cl.$^4$ ............................................. G01G 19/52
[52] U.S. Cl. .......................................... 177/50; 73/1 B; 180/65.6
[58] Field of Search ...................... 177/50, 16; 73/1 B; 188/76; 180/65.1, 65.6

[56] References Cited

U.S. PATENT DOCUMENTS

| | | | |
|---|---|---|---|
| 2,787,340 | 4/1957 | Murphy | 188/76 |
| 2,875,842 | 3/1959 | Morrell | 180/291 X |
| 3,027,961 | 4/1962 | Rogant | 180/65.1 X |
| 3,452,371 | 7/1969 | Hirsch | 180/65.1 X |
| 4,312,416 | 1/1982 | Hoyerman | 177/50 |
| 4,339,015 | 7/1982 | Fowkes et al. | 180/65.1 |
| 4,347,904 | 9/1982 | Dunbar | 177/50 |
| 4,406,338 | 9/1983 | Dunbar | 73/1 B |

OTHER PUBLICATIONS

4 page brochure entitled "Model BTP Tugger" by Hydrolectric Industrial Trucks.
Advertisement by Hydroelectric Lift Trucks, Inc. for a Model BTP Tugger.
Advertisement by Hydroelectric for a Model B Burden Carrier.

*Primary Examiner*—John J. Love
*Assistant Examiner*—Michael Mar
*Attorney, Agent, or Firm*—Merchant, Gould, Smith, Edell, Welter & Schmidt

[57] ABSTRACT

A self propelled scale testing vehicle (20). The vehicle (20) includes a platform (22) supported about the surface of the ground by four wheels (34), the platform including a generally horizontal top surface portion for removably retaining plurality of calibration weights (24, 26). A low, sturdy rail structure (28) is positioned of the perimeter of the platform (22) for retaining the calibration weights (24, 26) thereon. A DC motor (48) is interconnected to the front two wheels of the vehicle (20) by a direct drive mechanism (50). A DC battery power supply (46) is electrically interconnected to the DC motor (48) for providing power thereto. A mechanical brake assembly (44) is interconnected to the direct drive mechanism (50) and includes drum (76) and shoes (80, 82). Mechanical steering mechanism (42) is interconnected to the back two wheels, the steering mechanism including a chain (102) and sprocket (104, 106) assembly. An operator platform (40) is provided proximate the back end of the vehicle (20). Appropriate operator controls for braking and steering are provided proximate the back end of the vehicle (20) within easy reach of the operator when standing on the operator platform (40).

7 Claims, 10 Drawing Figures

SELF-PROPELLED SCALE TESTING VEHICLE

This is a continuation of application Ser. No. 552,671, filed Nov. 17, 1983, now abandoned.

BACKGROUND OF THE INVENTION

The present invention is directed generally to a self propelled scale testing vehicle of a calibrated weight adapted to transport additional calibrated weights for the testing and calibration of high capacity truck scales.

Platform or heavy capacity scales are used to weigh large quantities of bulk materials, such as grain, gravel, rock, concrete, and other raw materials. In addition, government regulations create a demand for the use of platform scales; for example, to determine whether trucks are in compliance with the various load limits placed on highways by the individual states. Platform scales are commonly used with weight loads ranging from a few tons to several tons.

Platform scales over a period of time have a tendency to provide inaccurate measurements. This is partly due to the environment in which the scales are utilized. Dirt and debris has a tendency to build up at various points in the scale mechanism, thereby restricting the action of the mechanism and also causing wear. When this occurs, the scale does not indicate the true weight of the load.

Therefore it is important to periodically calibrate a heavy capacity scale to assure accuracy. In the past, heavy capacity scales have been tested by placing individual weights, normally 500 pound units or 1,000 pound units upon the platform of a scale. Unfortunately, this method requires considerable amount of time and man power to unload the weights, test the scale and reload the weights onto the weight trasporting vehicle. Additionally, the accuracy of the platform scale may vary at different weight loadings. That is, the scale may indicate the correct weight at one point in its range, but exhibit inaccurate readings in another weight range. Therefore, calibration techniques required by state agencies commonly require a heavy capacity scale to be calibrated at different loading corners or sections of the scale.

Self propelled scale testing vehicles have been developed in an effort to provide a calibration device which is somewhat transportable, which is capable of carrying a varying quantity of calibration weights, which uniformly distributes the weight it is carrying, and which is easily movable about a platform scale. However, most of these vehicles are rather bulky and require transportation by a specially made or heavy duty trailer. Furthermore, the weight of the self propelled vehicle itself is not constant thereby causing a weigh inaccuracy. For example, weight cart calibration apparatus comprising a combustion drive engine and/or a hydraulic drive pump will vary in weight due to the changes in fluid volume. Since the gas in the gas tank varies and the hydraulics will have a tendency to leak out of the various valves, the weight of the cart will not remain constant.

Additionally, self propelled testing vehicles provide rather limited maneuverability and a single or limited range of speed. Accordingly, such vehicles are difficult to maneuver at the scale sight.

Further, self propelled vehicles do not provide for corner testing or calibration of a scale due to their rather large size.

The present invention solves these and many other problems associated with currently existing self propelled scale testing vehicles.

SUMMARY OF THE INVENTION

The present invention relates to a self propelled test weight vehicle for calibrating a heavy capacity weighing scale. The vehicle includes a platform supported above the surface of the ground by four wheels. The platform includes a generally horizontal top surface portion for removably retaining a plurality of calibration weights, a rail structure being positioned about a major portion of the perimeter of the top surface for retaining the calibration weights thereon. The platform provides for differing numbers and configurations of calibration weights to be retained thereon. A DC motor interconnected to the front two wheels of the platform by a direct drive mechanism is utilized for locomotion with a DC battery power supply electrically interconnected to the DC motor to provide power as required. A mechanical brake assembly is interconnected to the direct drive mechanism, the brake assembly including a drum and shoe assembly. A mechanical steering mechanism including a chain and sprocket arrangement is interconnected to the back two wheels to provide for steering the vehicle. An operator platform is provided proximate the back end of the vehicle with operator controls for braking and steering being provided proximate the back end of the vehicle within easy reach of the operator.

The present invention provides a self propelled scale testing vehicle of a substantially calibrated constant weight. The scale testing vehicle utilizes mechanical linkages for both steering and braking. Furthermore, the scale testing vehicle utilizes an electrical drive system. Accordingly, there are no fluids of varying volumn, such as gasoline and/or hydraulic fluid, which affects or varies the weight of the scale testing vehicle. Accordingly, the vehicle itself may be calibrated to a specific weight within a very slight tolerance range. The scale testing vehicle of the present invention is designed to meet the certification requirements of some state agencies responsible for testing platform scales, if not most or all state certification requirements.

The preferred embodiment of the present invention includes compartments for the addition of or substraction of weights. Various ones of these compartments are for larger quantities of weight whereas at least one compartment is provided for the addition or substraction of small amounts of weight such that the scale testing vehicle might be calibrated so as to meet extreme tolerance requirements.

The present invention further provides a self propelled scale testing vehicle which is highly maneuverable and easy to operate.

The vehicle is further adapted for receipt of additional calibrated weights of varying sizes and configurations.

The present invention provides for corner testing and center testing of scales.

In the preferred embodiment, the scale testing vehicle is provided with a variable forward speed and reverse speed. Furthermore, preferred embodiment of the present invention has a weight and overall dimensions such that the vehicle may be readily loaded into the bed of a truck or the like.

The present invention does not require any external electrical cords other lines from a power source. Accordingly, this enhances the safety features of the present invention and facilitates its maneuverability.

The mechanical braking mechanism of the present invention is adapted and configured to readily stop the vehicle and the mechanical steering mechanism enhances the manveurability thereof.

The present invention because of its mechanical and electrical components is safer than vehicles using hydraulic fluids. Also, the vehicle can be used in very cold temperatures which might otherwise affect hydraulic fluid.

In the preferred embodiment, the rear wheels turn and the front axle includes a differential mechanism such that the vehicle may turn sharply without imparting a twisting effect or torque on the surface it is turning on.

These and various other advantages and features of novelty which characterize the invention are pointed out in particularity in the claims annexed hereto and forming a part hereof. However, for a better understanding of the invention, its advantages, and objects attained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, which like reference numerals and letters indicate corresponding parts throughout several views.

DETAILED DESCRIPTION OF THE PREFERRED EMBODIMENT

Figure 1:
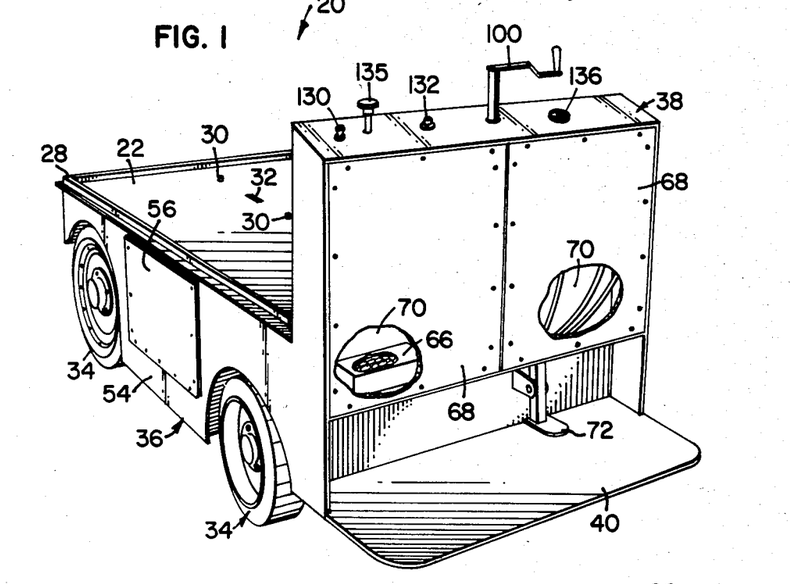
FIG. 1 is a view in perspective of a preferred embodiment of the present invention with portions broken away.

Referring now to FIG. 1 there is shown a preferred embodiment of the self propelled scale testing vehicle of the present invention, generally designated by the reference numeral 20. The vehicle 20 defines a relatively flat surface or bed 22 for supporting a plurality of calibration weights 24, 26 of varying sizes and configurations. A low, sturdy railing 28 extends about a major portion of the periphery of the weight support surface 22. The railing 28 functions to retain the weights 24, 26 on the relatively flat surface or bed 22. In addition, four spaced apart, longitudinally aligned anchor pins 30 extending above the surface of the bed 22 generally down the center thereof further provide for retaining the weights 24, 26 in position. Two longitudinally aligned, spaced apart rectangular apertures 32 are positioned in the bed surface 22 to enable a lift apparatus to extend through the aperture 32 and engage the vehicle's support structure for lifting of the vehicle. Preferrably, although not shown, cross members mounted directly below the apertures 32 will have suitable openings therein to enable a hook or the like to engage said support members for lift purposes.

The bed 22 is supported above the surface of the ground by four relatively smooth wheels 34 and by support framework 36 providing the vehicle with generally rectangular shape. At the back end of the vehicle there is a generally vertically extending portion 38 where the various operator controls are provided and the control circuitry of the vehicle is housed. Extending horizontally from the back end of the vehicle relatively close to the surface of the ground is a support platform 40 for the operator to stand on while operating the vehicle.

Figure 3:
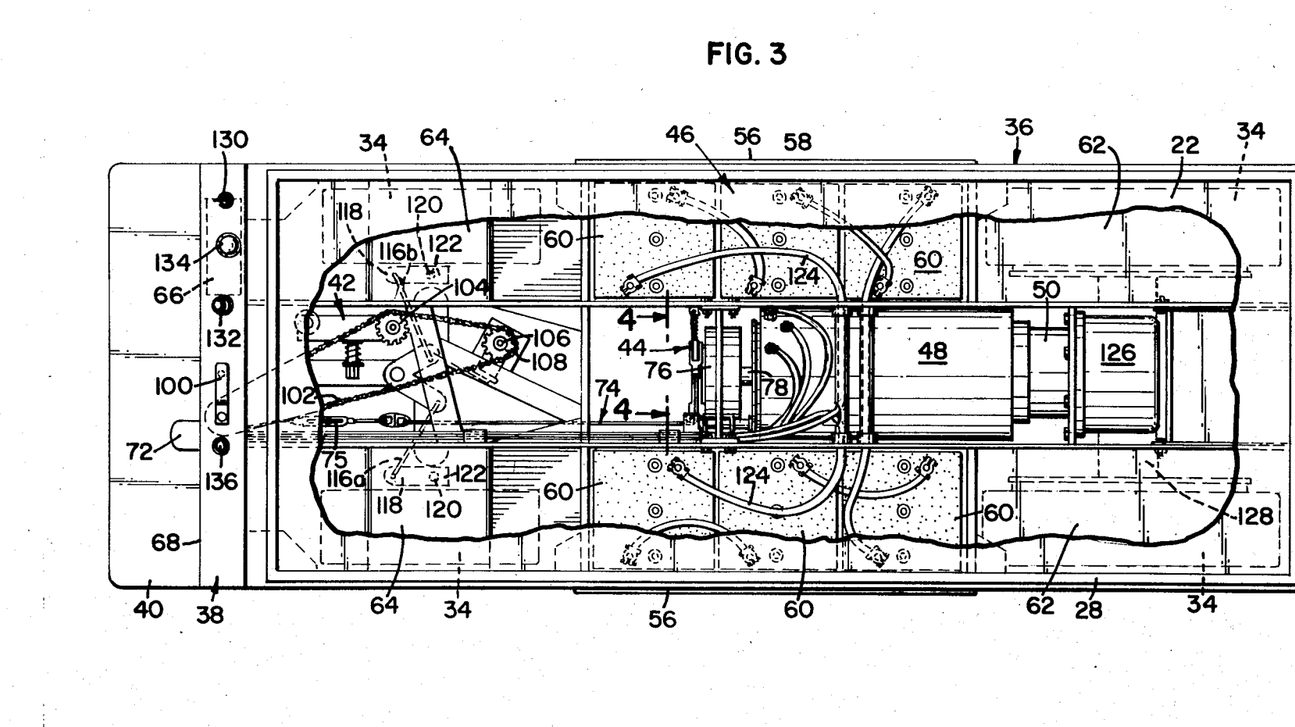
FIG. 3 is an enlarged top plan view with a major portion thereof broken away to disclose the steering, braking, drive, and electrical mechanisms.
Figure 4:
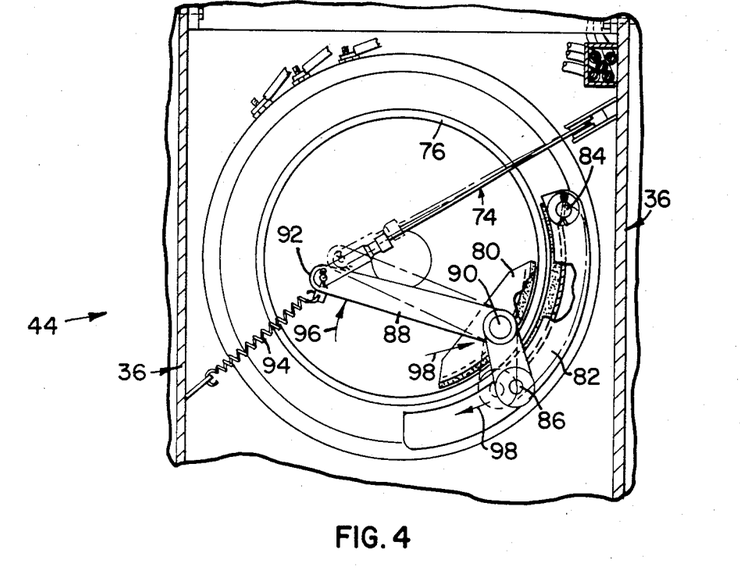
FIG. 4 is a view generally along line 4—4 in FIG. 3 with portions thereof broken away.
Figure 6A:
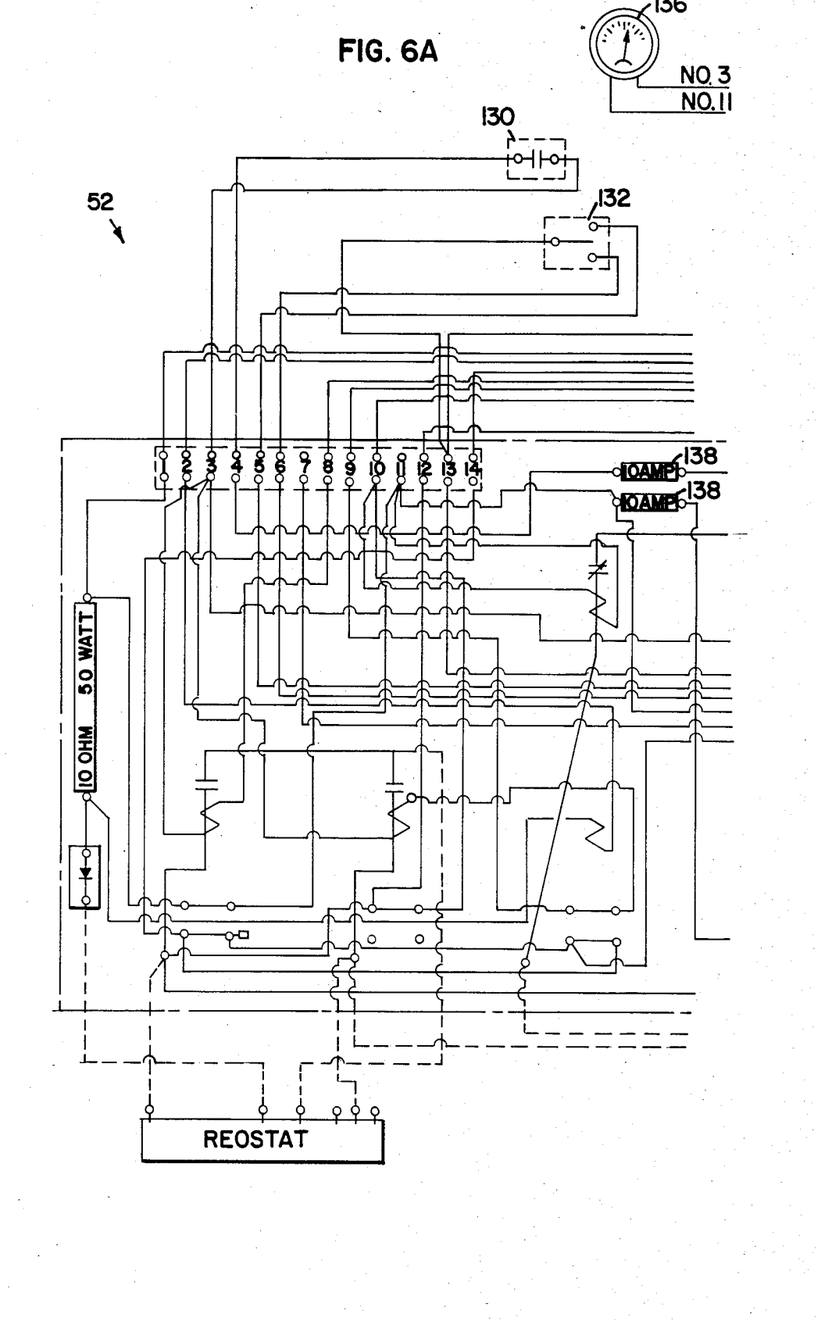
FIGS. 6a and 6b are an electrical schematic of an embodiment of a control system.
Figure 6B:
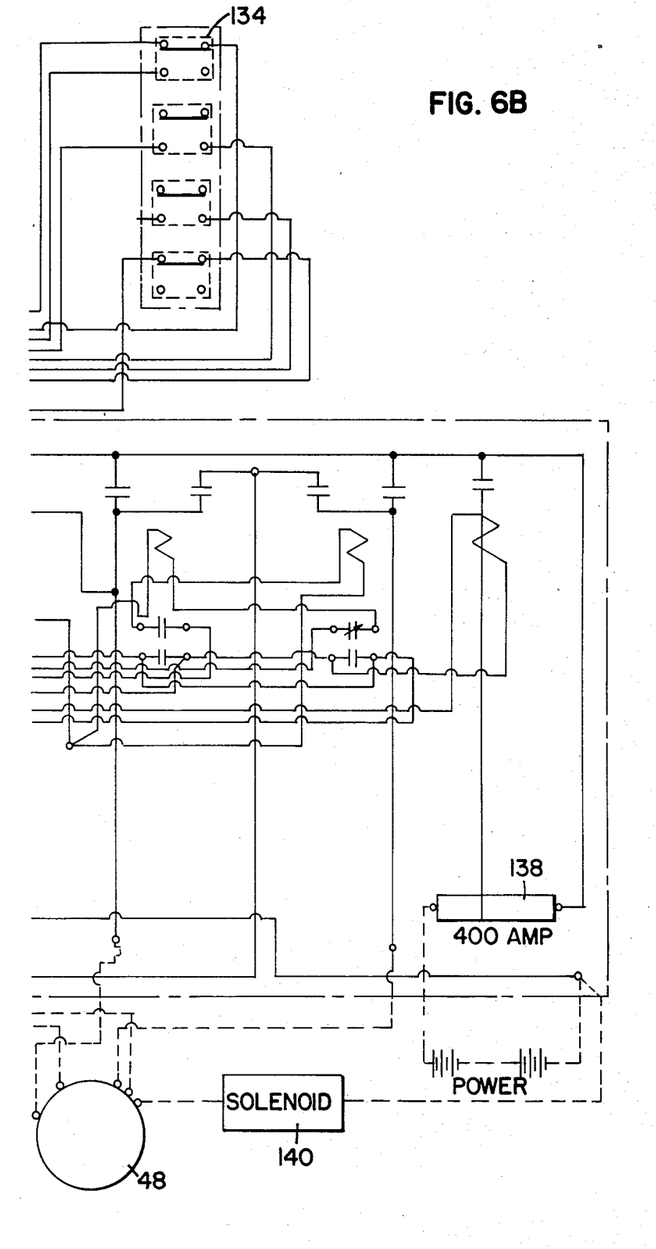
Figure 7:
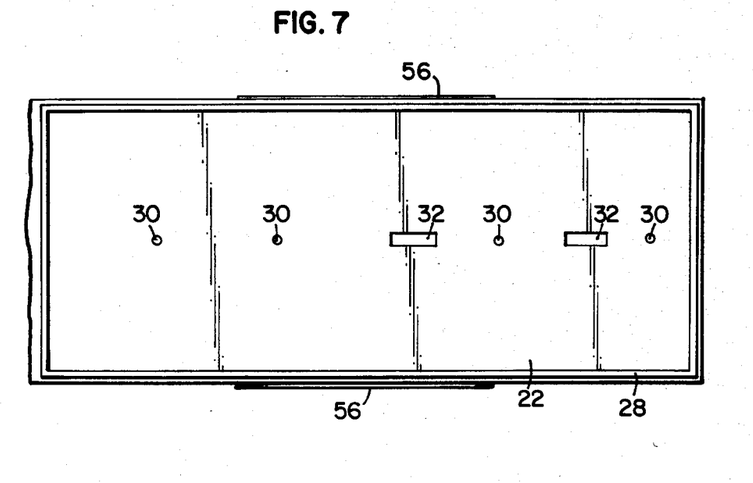
FIG. 7 is a top plan view of the embodiment shown in FIG. 1.
Figure 8:
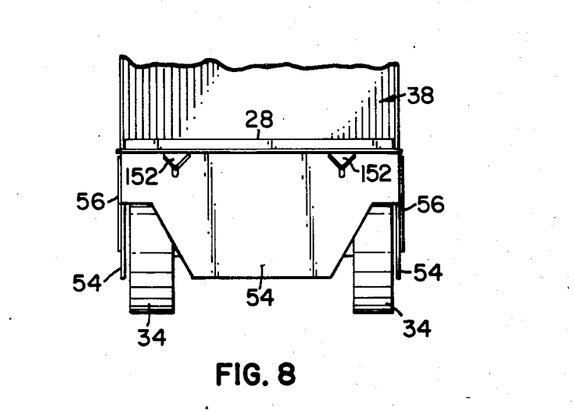
FIG. 8 is a front end elevational view of the embodiment shown in FIG. 1.

As generally illustrated in FIG. 3, the preferred embodiment of the present invention includes a mechanical steering mechanism 42 and a mechanical braking mechanism 44 both of which may be controlled by an operator standing on the support platform 40 while driving the vehicle. In addition, the preferred embodiment includes a DC electrical power supply system 46, a DC electrical motor 48, and a corresponding direct drive linkage 50. The present invention includes control curcuitry 52, one embodiment of which is illustrated in FIGS. 6a, b, providing directional and speed control in addition to other features. The preferred embodiment thus provides a scale testing vehicle with all mechanical and electrical components, thereby doing away use mechanisms requiring fluid reservoirs which might vary in weight.

Figure 2:
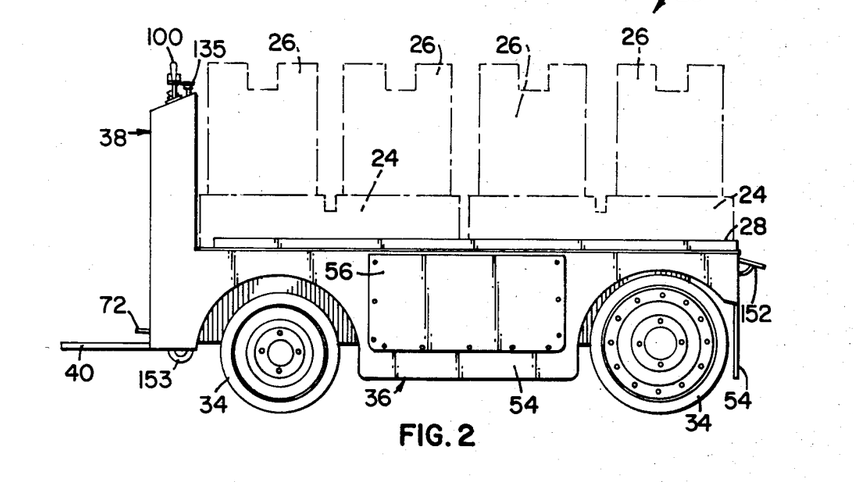
FIG. 2 is a side elevational view of the embodiment shown in FIG. 1 illustrating in broken lines various sizes an configurations of calibrated test weights positioned on the scale testing vehicle.

More particularly, as generally illustrated in FIGS. 1 through 3, the vehicle includes generally smooth vertically extending walls 54 which with the bed surface 22 largely enclose the steering, braking, and drive mechanism, the bottom of the vehicle also being largely enclosed. Access is provided to the DC power supply system 46 by removable panels 56 positioned at the side of the vehicle. In addition, the support framework 36 as is illustrated in FIG. 3 defines varying compartmental areas. Certain ones of these compartmental areas house the six (6), six volt batteries 60 utilized in the preferred embodiment. Yet other ones 62 of the compartmental areas provide for placement of a calibrated amount of weight which might be in the form of lead or the like. It will be appreciated, that while in the preferred embodiment the compartmental areas 62 are positioned generally at the front end of the vehicle over the front wheels, similar compartmental areas 64 might be provided at the back end of the vehicle generally over the back wheels or at other suitable locations within the vehicle. Accordingly, the vehicle itself can weigh varying amounts. For example, it is anticipated that for certain applications the vehicle itself will have a weight of from 2,500 to 5,000 pounds. Additionally the weight can be distributed as required.

Furthermore, the preferred embodiment of the present invention provides a compartment or weight box 66 in the vertically extending back end portion 38 wherein small amounts of weight such as individual lead weights, may be placed to enable calibration of the vehicle weight to very fine tolerances. Access to the compartmental area 66 is provided generally by removable panels 68 positioned on the back of the portion 38. Typically, the weight box 66 will hold from zero (0) to five (5) pounds of weight. The vehicle is calibrated by placing the vehicle on a calibrated scale such as a Russel Beam Balance and adding weights such as lead shot, etc. to the weight box 66 until the required weight is acheived. This enables the present invention to be calibrated within very narrow tolerances; for example, a vehicle weighing 2,500 pounds can be calibrated within two and one-half (2½) tenths of a pound and a vehicle weighing 5,000 pounds can be calibrated within five-tenths (5/10) of a pound.

The vertically extending portion 38 also provides compartmental areas 70 for containing much of the control circuitry 52.

Positioned near the support platform 40 is a foot pedal 72 for operation of the braking mechanism 44. As illustrated in FIG. 3 the brake pedal 72 is interconnected by a suitable pulley and cable arrangement 74 to a brake actuator mechanism including a drum 76 interconnected to a drive shaft 78 of the drive mechanism and to cooperatively interconnected brake shoes 80, 82 which actively engage the brake drum 76 when the operator presses down on the brake pedal 72 and correspondingly release the cylindrical brake drum 76 when the operator releases the brake pedal 72. The brake shoe 82 is pivotally supported by cylindrical member 84 which is stationary and fixedly interconnected to the drive mechanism. The brake shoe 82 is pivotally attached at location 86 by a cam actuator lever 88 which is pivotally interconnected to the brake shoe 80 at 90 intermediate of its ends and pivotally interconnected to the cable 74 at its distal end 92. Furthermore, a coil spring 94 interconnected to the support framework 36 is also attached to the distal end 92 of the lever 88 so as to bias the end 92 in a direction generally opposite that of the cable and pulley arrangement 84. When the operator steps on the brake pedal 72 the distal end 92 of the cam actuator lever 88 is made to pivot as generally indicated by the arrow 96 into the position indicated by the broken line such that the shoes 80, 82 are caused to move as generally indicated by the arrows 98 into engagement with the cylindrical drum 76 such that the vehicle is braked. When the pedal is released, the coil spring 94 causes the cam actuator lever 88 to pivot into the position generally indicated by the solid line such that the shoes 80, 82 are forced away from the surface of the drum such that the vehicle is no longer braked. As illustrated in FIG. 3, the brake cable and pulley assembly 74 might include a turn buckle 75 to enable tightening of the brake cable and correspondingly adjustment of the braking mechanism. Although not shown it will be appreciated that the cable and pulley system 74 will include appropriate pulleys interconnecting the brake pedal 72 to the cable 74.

The braking mechanism 44 of the present invention provides for vary safe and reliable braking. By simply pushing down on the pedal 72 the vehicle will mechanically be made to stop. The braking drum 76 has a relatively large diameter and the shoes 80, 82 engage a large surface area of the drum 72 to enable the momentum of the vehicle to be readily overcome. Furthermore, the braking mechanism 44 does not utilize any fluid which is subject to leakage. Accordingly, the braking mechanism will not cause a significant variation in the vehicle weight throughout a period of extended use. Also there is less likelihood of failure with the mechanical braking mechanism than with a hydraulic system.

Figure 5:
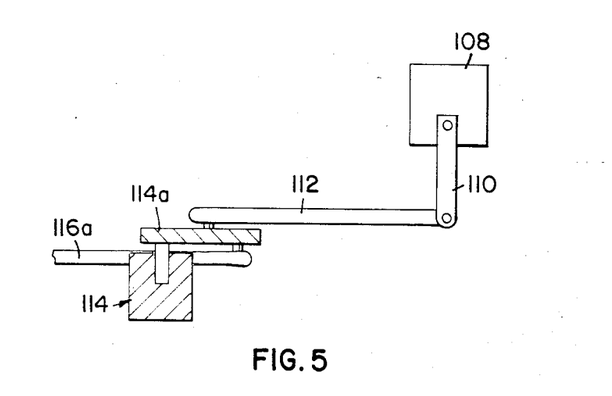
FIG. 5 is a diagrammatic view of a portion of the steering mechanism.

The steering mechanism 42 of the present invention includes a handle 100 providing for operator control. By turning the handle 100 about a generally vertical axis, the operator effectuates movement of a chain 102 interconnected to sprockets 104, 106 and a sprocket (not shown) interconnected to the shaft of the handle 100. The chain is interconnected to a conventional steering gear assembly which has interconnected thereto a vertically extending steering sector shaft arm 110 as diagrammatically illustrated in FIG. 5. The steering sector shaft arm 110 is interconnected via a drag link member 112 to an idler arm support assembly 114. Each of the idler arms 114a, b are interconnected by tie rods 116a, b, to spindle arms 118 projecting rearwardly of the spindles 120 which are pivotally interconnected to the back axle member 122. The mechanical steering mechanism 42 provides for accurate steering of the vehicle and the adjustment, idler sprocket 104 enables the tension of the system to be adjusted accordingly.

As previously indicated the DC power supply includes six (6), six (6) bolt batteries 60 interconnected in series by suitable interconnects 124 to the DC electrical motor 48. It will be appreciated that in alternate embodiments other varying combinations of batteries interconnected in series may be utilized to provide thirty-six (36) volts and that other voltages might be used such as forty-eight (48) volts. In the preferred embodiment, a six (6) horse power electric DC motor is utilized.

The DC electrical motor 48 is interconnected to a differential 126 positioned on a front axle 128 by the drive shaft 78. Accordingly, the vehicle is provided with front wheel drive. This eliminates any need for gear reduction by a gear box which would cause the vehicle to be noisier and breakdown more often. Also there are no fluids involved which would cause a variation in weight.

The control circuitry 52, an embodiment of which is schematically illustrated in FIGS. 6A, B, provides one embodiment of the present invention with three forward speeds and three speeds in reverse. The three speeds of the vehicle are approximately one (1) mile per hour, two (2) miles per hour, and three and one-half (3½) miles per hour. A keyed on/off switch 130 is provided on the vertically extending back end portion 38 within easy reach of the operator. Furthermore, a direction switch 132 which includes a control knob for actuation thereof is also provided on the back end portion 38 within easy reach of the operator. A contactor switch 134 which is actuated by a control knob 135 positioned on the back end portion 38 similarily within reach of the operator provides the vehicle with three speeds in both forward and reverse. A battery charge indicator 136 is also provided on the back end portion 38. Suitable fuses 138 are provided throughout the circuitry for safety reasons. A solenoid 140 is used to break the battery on/off switch interconnection such that if one of the contactors of the contactor switch 134 would accidentally stick, the vehicle can be readily stopped.

Figure 9:
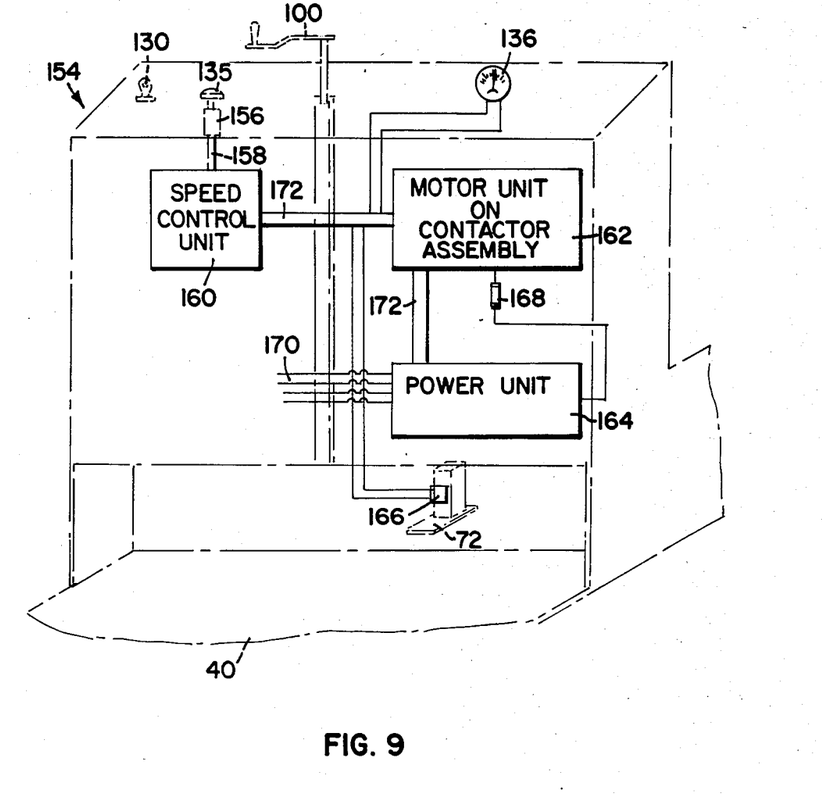
FIG. 9 is a block diagrammatic view of an alternate embodiment of a control system.

An alternate embodiment 154 of the control circuitry is diagrammatically illustrated in FIG. 9. The control circuitry is an SCR speed control assembly which provides the vehicle with variable speed control from zero to 4 m.p.h. in forward or reverse. In this embodiment of the control circuitry, the control knob 135 provides both speed and direction control. A direction sensing switch 156 interconnected to a shaft 158 of the control knob 135 is utilized to sense movement of the control knob to the right or left. The SCR control circuitry includes a speed control unit 160 interconnected to a contactor assembly 162 which is powered by a power unit 164. A limit switch 166 interconnected to the foot pedal 72 disables the SCR control circuitry if the brake is applied. A terminal block fuse 168 is provided in the SCR circuitry to take care of any overload voltages which may occur because of a short circuit. The power unit is interconnected to the DC power supply by suitable cables 170, while the various elements of the SCR control circuitry are interconnected by suitable electrical interconnect harnessess 172. As with the previous control circuitry, the SCR circuitry is interconnected to the battery discharge indicator 136. It will be appreciated that the specific features of the SCR control system will depend on the various specifications of the vehicle such a battery voltage, battery output, motor horsepower, motor r.p.m. required speed, operating environment, vehicle weight, etc. One such company which designs SCR speed control circuitry is Cable Form Inc., Zions Crossroads, Va. The SCR control system in addition to other features will increase battery life as it reduces the overall current use.

The present invention has sufficient power and maneuverability so as to enable it to be driven into a trailer. The front end of the vehicle includes two brackets 152 with a hook 153 positioned at the back end to enable the vehicle to be securely anchored on the trailer.

The weights 24 and 26 are sealed to class F tolerances and specifications listed in the National Bureau of Standards Handbook 105-1. As previously mentioned the configuration of the bed 22 and the low, sturdy railing 28 enable the vehicle to be loaded with various sizes and configurations of weights. This enables the vehicle to take on a broad range of weights. For example, a 5,000 pound vehicle might be made to vary between 5,000 and 20,000 pounds. Illustrated in FIG. 2, are 2,500 pound slab weights 24 and 1,000 pound test or block weights 26. Up to eight (8) of the block weights shown may be loaded onto the bed surface 22 in a single layer. The anchor pins 30 facilitate retaining the 2,500 pound slab weights in position. Of course, additional layers of slab weights might be added on top of the first layer of slab weights. Two of the 1,000 pound slab weights 24 can be carried out of the bed surface 22 in single layer. The slab weights 24 are positioned over the anchor pins 30 so as to be retained in place thereby. Once again, the slab weights may be configured in multiple layers. Anchor pins might be added to the top of the slab weights 24 to facilitate stocking of the weights. Accordingly, the present invention can take on a wide variety of calibration weights.

The railing may be used to support weights which extend over the sides of the vehicle thereby enabling the vehicle to be used with a wide variety of weight configurations. In the preferred embodiment, the railing 28 is one (1) inch high and three-eighths (⅜) inch wide and constructed so as to be capable of supporting several thousand pounds.

The dimensions of a preferred embodiment are approximately thirty and one-half (30½) inches wide, eighty-one (81) inches long, and forty-six (46) inches high. Accordingly, the vehicle can be readily transferred on a twelve (12) foot long trailer either in a loaded condition or an unloaded condition.

The configuration of the vehicle is generally long and narrow with the wheels being approximately fifty (50) inches apart in the longitudinal direction and thirty-five (35) inches apart (outside to outside) in the transverse direction. Accordingly, the vehicle can be driven onto a corner or center of the scale for testing the corner or center of the scale. The vehicle does not have to be pivoted once on the scale. Pivoting of a vehicle on the scale causes a twisting effect on the scale which pushes the scale to the side of the pit wall. This results in a balance shift which affect the accuracy of the scale. The present invention eliminates this problem. Since most high capacity scales are ten (10) feet wide, the vehicle will be preferrably less than four feet wide.

As previously mentioned the vehicle utilizes four wheels which are relatively smooth so as to not pick up any dirt or the like. Furthermore, the wheels have a relatively large width such that the vehicle will not become stuck in soft terrain. Preferably the wheels are solid rubber.

It is to be understood, however, that even though numerous characteristics and advantages of the invention have been set forth in the foregoing description, together with the details of the structure and function of the invention, the disclosure is illustrative only and changes may be made in detail, especially in matters of shape, size, arrangement of parts within the principal of the invention, to the full extent indicated by the broad general meaning of the terms in which the appended claims are expressed.

What is claimed is:

1. A self propelled test weight vehicle for calibrating a weighing scale having a weighing scale deck with a width of substantially ten feet or more; said test weight vehicle comprising:
   (a) a platform supported above the surface of the ground by four wheels, said platform including a generally horizontal top surface portion, a plurality of calibration weights of varying sizes, said platform being configured for supporting varying numbers and sizes of said calibration weights, a rail structure being positioned about a major portion of the perimeter of said platform for retaining said calibration weights, the test weight vehicle having a wheel base width of less than one-third the width of the weighing scale deck whereby corners of the weighing scale deck can be calibrated;
   (b) a DC motor interconnected to the front two wheels on said platform by a direct drive mechanism;
   (c) a DC battery power supply electrically interconnected to said DC motor and providing power to said DC motor;
   (d) a mechanical brake assembly interconnected to said direct drive mechanism, said brake assembly including a drum and a shoe assembly;
   (e) a mechanical steering mechanism interconnected to the back two wheels, said steering mechanism including a chain and sprocket assembly;
   (f) an operator platform provided proximate the back end of the vehicle;
   (g) operator controls for braking and steering positioned proximate the back end of the vehicle within easy reach of the operator; and
   (h) compartment being provided within said vehicle adapted for receipt of varying amounts of weight, the test weight vehicle itself having a substantially constant weight which can be changed by addition or deletion of the calibration weights whereby the test weight vehicle itself need not be calibrated each time it is used to calibrate a weighing scale.

2. A self propelled vehicle in accordance with claim 1, wherein the vehicle has a drive control system providing for variable speed in the forward direction and variable speed in the reverse direction.

3. A self propelled vehicle in accordance with claim 1, wherein the wheels are substantially smooth so as to eliminate the likelihood that the vehicle weight will be varied by dirt being collected on the surface of the wheels.

4. A self propelled vehicle in accordance with claim 1, wherein said platform include sealed compartments for the placement of a predetermined amount of weight so as to provide the vehicle with a predetermined overall weight.

5. A self propelled vehicle in accordance with claim 1, wherein the vehicle has a wheel base less than four feet in width.

6. A self propelled test weight vehicle for calibrating a weighing scale; said test weight vehicle comprising:

(a) a frame supported above a surface of the ground by for wheels, said frame supporting a substantially flat, horizontal platform, for a plurality of calibration weights of varying sizes which are removably positionable on said platform, said platform being configured to support varying numbers and sizes of said calibration weights, said platform including a low rail structure positioned about the periphery of said platform, said rail structure necessarily being capable of providing support for several thousand pounds of calibration weights, said rail structure assisting in removably retaining calibration weights on said platform and supporting oversized calibration weights above the surface of said platform, the test weight vehicle having a wheel base width of less than one-third the width of a weighing scale deck whereby corners of the weighing scale deck can be calibrated;

(b) a DC motor interconnected by a direct drive mechanism to a differential mechanism positioned on an axle interconnecting the front two wheels;

(c) a DC battery power supply electrically interconnected to said DC motor providing power to said DC motor;

(d) mechanical steering means including a sprocket and chain assembly and interconnected to the back two wheels for steering the vehicle under operator control, the mechanical steering means and the differential mechanism on the front axle cooperating to eliminate any twisting effect on the surface where the vehicle is being turned;

(e) mechanical brake means interconnected to said direct drive mechanism for braking the vehicle under operator control, said brake means including a foot pedal actuator movable between an up, deactivated position wherein the vehicle is not braked, and a down, activated position wherein the vehicle is braked, said foot pedal actuator being interconnected to a drum and shoe assembly of said mechanical brake means by a cable and pulley arrangement, said mechanical brake means including means for adjusting said mechanical brake means;

(f) an operator platform provided proximate the back end of the vehicle near the surface of the ground;

(g) operator controls for operating the vehicle being positioned proximate the back end of the vehicle within easy reach of the operator;

(h) the wheels of said vehicle providing a wheel base having a width of less than four (4) feet; and (i) compartments provided within said vehicle adapted for receipt of varying amounts of weight whereby the weight of the vehicle may be varied by adding or substracting weights to have a predetermined calibrated weight, the test weight vehicle itself having a substantially constant weight which can be changed by addition or deletion of the calibration weights whereby the test weight vehicle need not be calibrated each time it is used to calibrate a weighing scale.

7. A self propelled test weight vehicle for calibrating a weighing scale having a weighing scale deck with a width of substantially ten feet or more; said test weight vehicle comprising:

(a) a platform supported above the surface of the ground by at least four wheels, plurality of calibration weights of varying sizes, said platform including surface portion means for removably retaining a plurality of said calibration weights, the test weight vehicle having a wheel base width of less than one-third the width of the weighing scale deck whereby corners of the weighing scale deck can be calibrated;

(b) a DC motor interconnected to the front two wheels on said platform by a direct drive mechanism including differential means for enabling differential movement of the front two wheels;

(c) a DC battery power supply electrically interconnected to said DC motor and providing power to said DC motor;

(d) a mechanical brake assembly interconnected to said direct drive mechanism, said brake assembly including a drum and a shoe assembly;

(e) a mechanical steering mechanism interconnected to the back two wheels, said steering mechanism including a chain and sprocket assembly; and (f) an operator platform and operator controls for braking and steering the vehicle, the test weight vehicle itself having a substantially constant weight which can be changed by addition or deletion of the calibration weights whereby the test weight vehicle need not be calibrated each time it is used to calibrate a weighing scale.

* * * * *

UNITED STATES PATENT AND TRADEMARK OFFICE
CERTIFICATE OF CORRECTION

PATENT NO. : 4,637,481  Page 1 of 2
DATED : January 20, 1987
INVENTOR(S) : ROGER E. SHOEMAKER It is certified that error appears in the above-identified patent and that said Letters Patent is hereby corrected as shown below:

```
Column 1, line 36, delete "trasporting" and insert
     --transporting--.
Column 2, line 46, delete "substraction" and insert
     --subtraction--.
Column 2, line 49, delete "substraction" and insert
     --subtraction--.
Column 2, line 63, after "Furthermore", insert --the--.
Column 2, line 68, between "cords" and "other", insert --or--.
Column 3, line 6, delete manveurability" and insert
     --maneuverability--.
Column 3, line 29, before "which", insert --in--.
Column 3, line 37, delete "an" and insert --and--.
Column 4, line 6, delete "Preferrably" and insert --Preferably--.
Column 4, line 35, delete "use" and insert --with--.
Column 5, line 8, delete "acherved" and insert --achieved--.
Column 5, line 59, delete "vary" and insert --very--.
```

UNITED STATES PATENT AND TRADEMARK OFFICE
CERTIFICATE OF CORRECTION

PATENT NO.   :   4,637,481                     Page 2 of 2
DATED        :   January 20, 1987
INVENTOR(S)  :   ROGER E. SHOEMAKER It is certified that error appears in the above-identified patent and that said Letters Patent is hereby corrected as shown below:

Column 6, line 23, delete "bolt" and insert --volt--.
Column 6, line 52, delete "similarily" and insert --similarly--.
Column 7, line 18, delete "a" and insert --as--.
Column 8, line 12, delete "preferrably" and insert
    --preferably--.
Column 8, line 25, delete "principal" and insert --principle--.
Column 9, line 24, delete "for".
Column 10, line 29, before "plurality", insert --a--.

Signed and Sealed this

Twenty-second Day of September, 1987

Attest:

DONALD J. QUIGG

*Attesting Officer*       *Commissioner of Patents and Trademarks*